April 6, 1943.  E. A. KOETHER  2,315,798
PACKING RING OR BEARING ELEMENT
Original Filed Oct. 15, 1938    3 Sheets-Sheet 1

Inventor
Emil A. Koether
By Dodge and Sons,
Attorneys

Patented Apr. 6, 1943

2,315,798

UNITED STATES PATENT OFFICE 2,315,798

PACKING RING OR BEARING ELEMENT

Emil A. Koether, Baltimore, Md., assignor, by mesne assignments, to Standard Oil Company of California, San Francisco, Calif., a corporation of Delaware Application October 15, 1938, Serial No. 235,228

9 Claims. (Cl. 309—44)

This invention pertains to improvements in packing rings or bearing elements.

It is a well known desideratum in connection with piston rings, and particularly those which are to be employed in automotive work, to have a ring which, while possessing the qualities of a high grade and effective ring will, nevertheless, wear or "seat in" quickly. Various rings have heretofore been produced and others suggested with these advantages in view, but so far as I am aware none of them have met with marked success. The result is that unless an automotive engine is "worn in" at the factory, the owner of a new car is under the necessity of maintaining a relatively low speed during the first five hundred to one thousand miles, for otherwise damage to the cylinders and rings will inhere.

Broadly stated, the invention resides in producing a bearing surface integral with the ring, which surface will at once absorb or be wetted by the oil employed for lubrication purposes, and this without changing or in any wise reducing the physical dimensions of the ring.

It has heretofore been proposed to produce packing or piston rings with seating surfaces designed to promote quick "wearing-in." However, so far as I am aware, such prior methods involved coating the ring with a separate substance (such as cadmium, tin or graphite) and also the cutting of grooves or ridges in the ring and filling such grooves with softer substances (such as lead, copper, graphite, etc.). Also, it is well known in the art to tin-plate the surfaces of piston rings or to copper-plate them, or even to coat them with a coating of zinc or other relatively softer metal.

In all such instances, however, the physical dimensions of the rings or articles so coated are changed and the coating or plating is with an extraneous material whereas, in the present invention, no extraneous material is employed but a metamorphosis of the sealing surfaces takes place which results in imparting a different physical characteristic to the surface without any change in the physical dimensions thereof. This metamorphosis may be brought about in various ways, such as by treating the rings in an electrolytic bath wherein hydrochloric acid is employed, or by soaking the rings in a heated solution of a mineral acid such as sulphuric acid, phosphoric acid, and other similar materials.

Cast iron piston rings contain approximately 10% by volume of free graphite, and also contain other harder elements, such as iron phosphide, commonly known as Steadite, which forms a network throughout the ring and which is very hard and resistant to the attack of such compounds as may be used in the treatment of the ring as hereinafter set forth. This hard network of Steadite and the relatively large amount of free graphite present in the ring, which is unaffected by such treatment, will maintain the physical dimensions of the ring even though a large portion of the free ferrite and iron carbides are dissolved. Furthermore, since by reason of the treatment the attack on these elements is from the surface of the ring inwardly thereof, there is a gradual increase in the hardness of the ring inwardly from the surface, leaving a relatively greater amount of free graphite on the surface of the ring which decreases in volume inwardly thereof until all traces of the attack of the compound disappear.

Consequently, a piston ring is produced with a somewhat pitted surface, due to the dissolution of certain compounds indigenous to the ring, and containing a large volume of graphite on the surfaces which gradually decreases inwardly of the ring. The surface possesses a marked ability to absorb oil. This feature is highly advantageous in a piston ring and enables a new engine to be broken in much more rapidly and satisfactorily without the danger of scuffing and seizing, which is characteristic of an ordinary cast iron ring not so treated.

When subjecting the ring to the action of an electrolytic bath, those portions or surfaces which are not to be modified are protected against the action of the acid of the bath, and this may be done in various ways. One may coat the ring with wax by a very simple operation, which requires merely rubbing over the surface of the ring a solution containing a very high percentage of wax in a suitable solvent, which solvent readily evaporates and leaves a wax coating on those portions or faces of the ring to which the wax solution has been applied. For instance, if it be desired to protect the side faces of a ring, one merely rubs the ring over a cloth saturated with the wax solution and allows the solvent to evaporate, which leaves a wax film upon such sides. The same process can be applied to the inside by rubbing the wax solution around the inside surface of the ring, and thus all surfaces except the cylinder-contacting face of the ring will be protected.

It is also possible to place a number of rings on an arbor, side to side, and close the rings by means of a core box so that the joints in the rings will come together. If this process is carried on, it will not be necessary to coat the surfaces of the rings with the wax solution, as the sides of the two end rings will be protected by the collars on the arbor and what little acid might seep through the minute cracks that may appear between the joints to the inside of the rings will be so slight as to be negligible. Therefore, when this process is carried out, practically the only surface exposed to the acid in the bath would be the periphery of the ring. (See U. S. Letters Patent No. 1,852,529, dated April 5, 1932.)

The cylinder-contacting face of the ring is then the only part subject to the action of the acid, it being understood that the ring is submerged in a 25% solution of commercial hydrochloric acid at 80° F., or thereabouts, utilizing the ring as the anode and impressing upon the bath a direct current of 5 to 10 volts. The strength of the current naturally depends upon the relative mass of the anode and cathode. This would be governed by the size of the rings, that is, whether large diameters or small diameters, and the number of rings to be treated at one time. The strength of the current will also vary according to the temperature of the solution, as well as the acid strength of the solution. The depth of the penetration or change which is effected in the cylinder-contacting surface naturally depends upon the various factors just above mentioned, time also entering into the equation.

The result is that the cylinder-contacting face of the ring is transformed so as to present a large proportion of free graphite with the reaction products of the treating agent and the metal surface. For lack of a better term, I shall refer to a surface so treated as "graphitized."

Most iron which is of a graphitic nature may be employed, but preferably I use grey cast irons of the type wherein an appreciable amount of the mass by volume is graphitic carbon, which is unaffected by acids. Cast iron, when subjected to the action of hydrochloric acid, is readily attacked in the following manner:

(1) $Fe + 2HCl \rightarrow FeCl_2 + H_2$
(2) $FeS + 2HCl \rightarrow FeCl_2 + H_2S$
(3) $MnS + 2HCl \rightarrow MnCl_2 + H_2S$ In Equation 1 the iron combines with chlorine to form ferrous chloride, resulting in the evolution of free hydrogen. In Equations 2 and 3, chlorides are also formed along with hydrogen sulphide, the latter in the form of a gas; Equation 3 indicating the presence of Mn in ring blanks.

Again, when the iron carbides are acted upon by the acid in the bath, ferrous chloride is produced with the release of molecules of hydrogen and carbon, somewhat as follows:

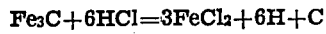

$$Fe_3C + 6HCl = 3FeCl_2 + 6H + C$$

The result is that in grey cast irons employed in the manufacture of the rings of my invention, approximately 10% of the mass by volume is graphitic carbon, which is entirely unaffected by acids. This relatively soft material results in giving grey irons, when subjected to acid attack, a greasy film or portion, and also largely retards the penetration of the acid into the body of the metal. The wearing portion formed, therefore, is made up largely of graphite, with lesser amounts of iron chloride or manganese chloride, if manganese be present in the mix.

As a consequence, a film or wearing surface is produced upon the exterior of the ring which presents a graphitized surface free or substantially free of iron carbides, which latter, of course, are relatively hard and preclude the quick "wearing in" of the ring. The cylinder-contacting surface of the ring produced in the manner above specified, which as just noted is practically free from hard iron carbides, is abundant with soft graphitic practice. The iron chlorides, iron phosphates, and the like formed by the reaction of the acid on the surface impart thereto improved oil wetting or spreading properties. This surface is also more porous than the structure in the body of the ring as the partial metamorphosis of certain constituents in the ring, such as the ferrite and carbides, leaves cells, pits or slight voids in the surface that allow the surface to absorb oil more readily than would a surface not so treated. Such a surface upon a ring will at once become "wetted" by the oil and will quickly "seat in," allowing an engine equipped with them to be immediately put into service at maximum speeds and loads.

Seeking to illustrate the invention, there are shown in the annexed drawings, reproductions of eleven photomicrographs, designated as Figures 1 to 11, inclusive.

In Fig. 1 the surface of the ring is shown, the threaded effect of the tooling still being present. The white spots appearing in the picture are crystals which happen to have their plane surfaces such that they reflect the light back into the microscope, making them appear brighter than the surrounding mass.

In Fig. 2 there is shown a portion of the ring surface which has been formed as above set forth in Fig. 1, and buffed on a velvet disc with alumina. The light network shown is made up of phosphide and carbide constituents substantially free of iron carbides as such, these constituents being attacked very slightly by the acid of the bath, so that on polishing or wearing away of the softer surrounding metal in service, they appear in relief. This results in a pitted or matted surface, which would readily adapt itself to slight irregularity in surface contact, and largely explains why the rings given the treatment above specified "seat in" so rapidly.

Fig. 3 is the same as Fig. 2 but with a higher magnification. In this picture the body of the metal has been brought into focus, resulting in the out of focus condition seen in the network of Steadite or phosphides and carbide constituents substantially free of iron carbides as such, further illustrating that they stand out in relief, and take a bearing before the body of the metal is in contact. This figure perhaps shows less than Fig. 2 which is taken at a lower magnification.

In Fig. 4, the surface has been polished on #0 to #000 French emery, followed by buffing with levigated alumina. Nearly all of the results of the acid attack have been removed, and the structure is approaching that of a normal untreated ring. The large spots are the bottom of the "crater" or pits, giving the irregular appearance of the graphite. Approximately 0.002" of metal has been removed.

In Figs. 5, 6 and 7, a cross-section of a ring mounted upon a Bakelite backing is shown, this with a view of bringing out as clearly as possible the depth of penetration from the outer surface inwardly. The Bakelite backing or mold was employed in order that the exposed surface of the ring could be more readily polished without rounding the corners, which rounding would have thrown the edge of the ring out of focus.

In Fig. 5 the magnification is of the order of 50 and clearly depicts the depth of penetration due to the treatment. The outside diameter of the ring is defined by the outermost light portions. It will be noted that the treatment results in what might be termed a "sawtooth" irregular profile, giving a matte appearance. It will also be seen that some portions of the metal are not attacked, these being relatively hard crystals embedded in a soft backing.

Figure 1:
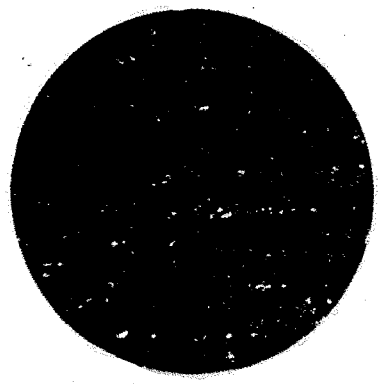
Figure 3:
Figure 2:
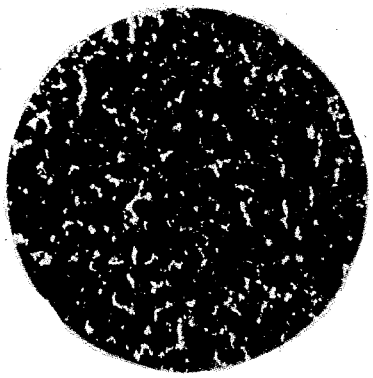
Figure 4:
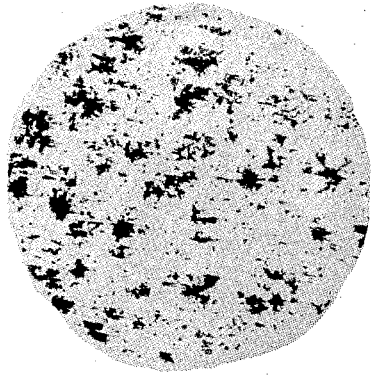
Figure 5:
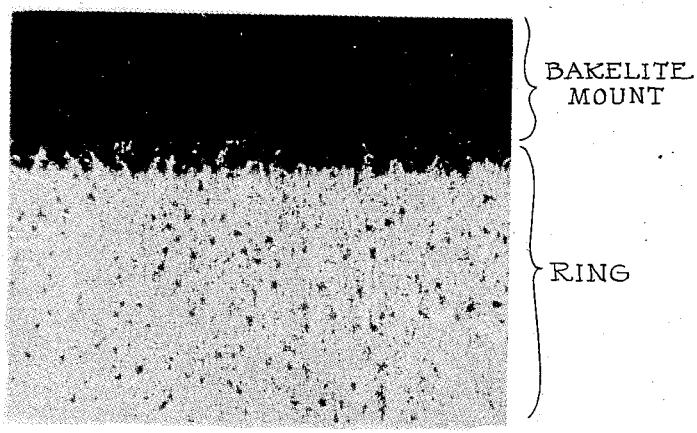
Figure 6:
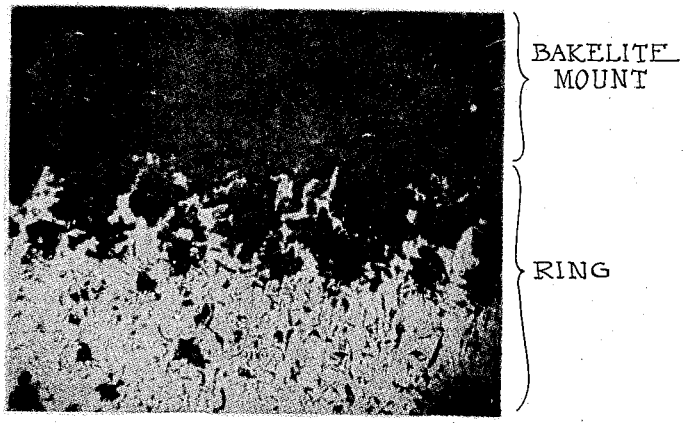
Fig. 6 is the same as Fig. 5 but with a higher magnification, the magnification being of the order of 200. Here, the band of attacked metal is clearly visible, the irregularity of the attack being readily apparent.
Figure 7:
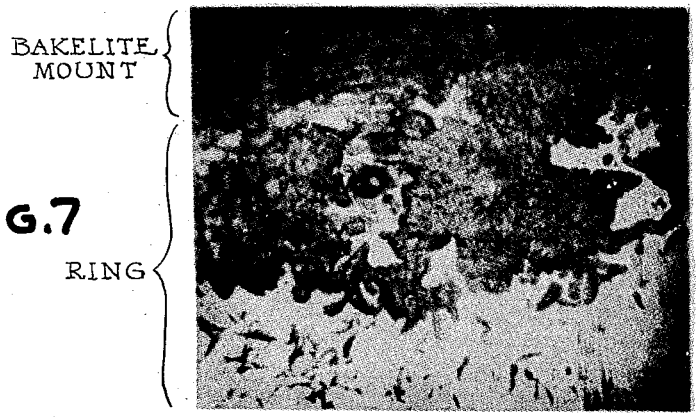
Fig. 7 is a further view wherein the ring section is mounted as above set forth, the magnification being of the order of 500 and illustrating further details of the treated layer.

Upon inspection of Figs. 5, 6 and 7, it will be seen that there undoubtedly is a relative increase in the harder elements of the ring as the distance from the periphery or bearing surface increases; in other words, there is a greater preponderance of softer elements of the ring on the periphery decreasing relatively as the distance from the surface increases. Thus, as above noted, a surface is provided which will quickly "wear in," backed up by the ring body proper which ultimately takes the wear and forms the final seal. Inasmuch as the graphitized surface forms but a relatively small portion of the ring body, it will be seen that the ring is not weakened by the treatment.

Figure 8:
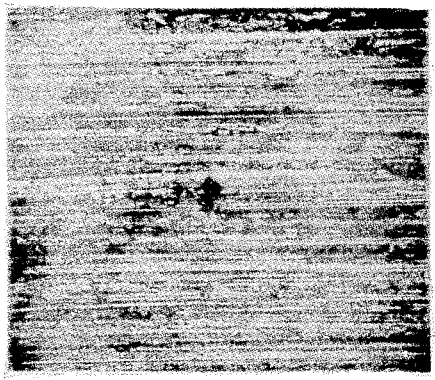

In Fig. 8 there is shown a portion of a ring surface which has been plain ground finished, the magnification being of the order of 100, and prior to any treatment. The initial ground surface of the ring, though nearly "mirror-smooth" to the eye, has deep grind marks and a sizeable amount of loosely adhering metal fragments.

Figure 9:
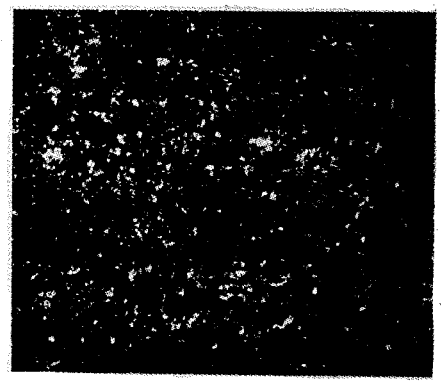

In Fig. 9 the surface is shown after graphitizing and exhibits no grinding marks, having instead a smooth matte finish which ensures good oil absorbing and "wetting" characteristics.

Figure 10:
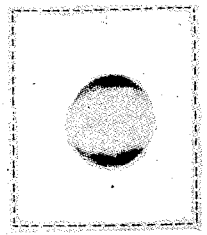
Figure 11:
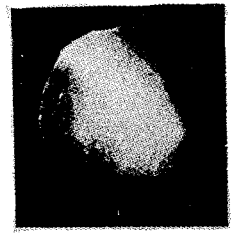

With a view of showing the difference in oil absorption characteristics between a plain untreated and a treated ring, reference is had to Figs. 10 and 11. In Fig. 10 a ring surface such as is shown in Fig. 8 has had placed thereon a drop of light engine oil. It will be seen that the oil does not spread but, on the other hand, maintains a somewhat globular form. In Fig. 11 the same amount of oil was placed upon a ring surface such as is shown in Fig. 9 and, as will be seen, the graphitized surface insures a better spreading of the oil. After setting fifteen minutes, the graphitized specimen was completely covered or wetted with oil, whereas very little change occurred on the surface of a ring such as depicted in Fig. 10.

While I have mentioned particularly in the specification the use of hydrochloric acid and an electrolytic bath, as stated hereinbefore similar results can be obtained by the use of sulphuric acid, phosphoric acid, and other similar materials. In fact, it is not even necessary to subject the rings to an electrolytic process but by soaking them in a heated solution of mineral acids or other compounds one can obtain similar results.

While the method has been described more particularly with reference to piston rings, it will be appreciated that rings for rod packings or bearing elements may be produced in a like manner, it being kept in mind in such case that the bearing face of the packing or element will be left unprotected against the action of the bath or treating agent.

The term "ring" as employed in the claims is, therefore, to be considered in a broad sense unless the substance of the remainder of the claim precludes such interpretation.

This application is a continuation in part of my application Serial No. 121,221, filed January 18, 1937, which, in turn, is a continuation of my original application Serial No. 17,546, filed April 20, 1935.

No claim is made herein to the method of producing packing rings or bearing elements as the same forms the subject matter of my divisional application, Serial No. 318,181, filed February 9, 1940.

What is claimed is:

1. A piston packing ring formed of cast iron, the wearing surface of said ring containing a greater relative proportion of graphite to the other elements of the casting on the said wearing surface than in the body of the ring, the graphite content of said wearing surface being indigenous to the casting and proportionally decreasing inwardly thereof, whereby the wearing surface of said ring, unchanged in physical dimensions, issofter with better bearing and lubricating characteristics than the body of the ring.

2. A cast iron piston ring having its sealing face formed primarily of Steadite and graphite.

3. A cast iron piston ring, the sealing face whereof consists of a network of Steadite and graphite both indigenous to the ring, the graphite being enmeshed and held in pockets formed in and by the Steadite.

4. As a new article of manufacture, a cast iron bearing element having at least one bearing face presenting a porous and indigenous graphitic surface, said surface being substantially free from iron carbides.

5. As a new article of manufacture, a cast iron packing ring presenting a porous wearing surface indigenous to the body of the ring and substantially free from iron carbides.

6. As a new article of manufacture, a ferrous metal ring providing a bearing face the structure thereof being substantially free from iron carbides and abundant with soft graphitic particles indigenous to the body of the ring.

7. As a new article of manufacture, a grey cast iron piston ring wherein the sealing surface is porous, abundant with soft graphitic particles, and substantially free of iron carbides.

8. As a new article of manufacture, a packing ring formed from grey cast iron and having a porous bearing surface abundant with soft graphitic particles indigenous to the casting, said surface being produced by subjecting that portion of the ring blank which is to constitute the bearing surface to the action of a chemical agent to substantially remove the iron carbides.

9. A piston ring formed of cast iron containing phosphorus and having a network formed by the phosphorus-rich constituent, said ring having a cell-like surface formed by the ring being chemically treated with an acid solution which will dissolve, to some extent, the material within the network formed by the phosphorus-rich constituent to leave said constituent in relief and maintain the physical dimensions of the ring.

EMIL A. KOETHER.